Nov. 18, 1969   R. RATNOFF   3,478,570

ELECTRICAL CLINICAL THERMOMETER

Filed Jan. 23, 1968

INVENTOR.
RAYMOND RATNOFF

BY *[signature]*

ATTORNEY.

United States Patent Office 3,478,570
Patented Nov. 18, 1969

3,478,570
ELECTRICAL CLINICAL THERMOMETER
Raymond Ratnoff, 1106 Normandy Drive,
Miami Beach, Fla. 33141
Filed Jan. 23, 1968, Ser. No. 699,838
Int. Cl. G01c 17/38
U.S. Cl. 73—1
6 Claims

ABSTRACT OF THE DISCLOSURE

A null-type rebalancing bridge thermistor thermometer, in which the bridge leg adjacent the thermistor contains a readout resistor and a calibrating resistor, and the other two legs consist of a potentiometer with a tap adjustable for calibrating purposes. The calibrating resistances enable the device to be set for a desired range of any thermistor used. The values of the calibrating resistances are determined by two calibrating bridges.

This invention is concerned with a thermometer for accurately measuring temperatures within any limited predetermined range and, more particularly, a clinical thermometer, that is rapid, convenient and accurate in operation and compact in its parts so that it can be held and operated with one hand. This invention is particularly concerned with an electrical thermometer for accomplishing these results while at the same time being simple and inexpensive to manufacture since it can use common commercial components without requiring exact calibration or exact determination of numerical resistance values of the components.

The prior art electronic thermometers have often used a heat sensitive resistor known as a thermistor. These thermistors are commercially available and usually of the negative coefficient type, that is their electrical resistances decrease with rise in temperature. In my invention I use for illustrative purposes this type of commercially available negative coefficient type thermistor, although my circuit would work equally well with a positive coefficient type thermistor, that is, one in which the resistance increases with rise in temperature.

One reason that electrical thermometers using commercial thermistors have been quite expensive is that it has been necessary to accurately determine the resistance value of each thermistor individually or to use some resistance compensating device since despite their possible similar nominal resistance values at 77° F., there is found to be a substantial variance among commercial thermistors in their resistance values at about 96° F., which is the useful low point of temperature for clinical work. It has also been found that while some of the thermistors have the same resistance value at the lower range of clinical work, for example 96° F. they will often have differing resistance values at the higher range of clinical work, for example at about 106° F. I have found that the resistance difference obtained by subtracting the thermistor resistance at the high temperature point of the chosen temperature range from the thermistor resistance at the low temperature point of the chosen temperature range has a substantially constant ratio to the thermistor resistance obtained at the high temperature point of the chosen temperature range for any given type of commercial thermistor.

Expressed mathematically this can be put $$\frac{T_L - T_H}{T_H} \text{ or } \frac{T_D}{T_H}$$

where $T_L$=the resistance of the thermistor at the low temperature of the chosen temperature range, $T_H$ is the resistance of the thermistor at the high temperature of the chosen temperature range and $T_D$ is the difference of resistance between $T_L$ and $T_H$.

I have invented a new type of circuit which will utilize this ratio relationship and will also eliminate the necessity for exact determination of resistance values of either thermistors or other components or calibration of the components in the circuit.

Our electric thermometer employs common commercial non-calibrated non-exact (1) thermistor (2) null-meter (3) current source in series with a push-button switch (4) two variable resistors (5) a potentiometer (6) a pre-imprinted dial. The device provides accurate temperature measurement with no dependence on exact, known or compensated resistance values. Its accuracy results from adjustment during manufacture of certain proportionate relationships or ratios. For illustrative purposes only, we will use a negative coefficient type thermistor, one whose resistance decreases with rise in temperature, although the circuitry would be equally valid for a positive coefficient type thermistor. The following glossary is provided to simplify explanation of our system:

H is the high temperature point of our chosen temperature range.

L is the low temperature point of our chosen temperature range.

D is the difference in temperature between H and L.

$T_H$ is the resistance of the thermistor exposed to H.

$T_D$ is the difference in resistance of the thermistor from $T_H$ when the thermistor is exposed to L.

The primary relationship to be used is $T_D/T_H$.

$R'_H$ is the resistance value of a variable resistor $R_H$ adjusted to equal $T_H$.

$R'_D$ is the resistance value of a variable resistor $R_D$ adjusted to equal $T_D$.

$R_R$ is an integral component of our thermometer and is a variable resistor at its maximum value.

$R'_B$ is an integral component of our thermometer and is the adjusted resistance value of a variable resistor $R_B$ adjusted so as to provide the ratio $$\frac{R'_D}{R'_H} = \frac{R_R}{R'_B}$$

By means of a test adjusting bridge, to be further described in FIGURE 2 after exposing our non-calibrated thermistor to the extremes of our chosen temperature range H and L and balancing to a null reading we obtain the ratios $$\frac{T_D}{T_H} = \frac{R'_D}{R'_H}$$

By means of a second test adjusting circuit, to be further described in FIGURE 3 we obtain the ratio $$\frac{R'_D}{R'_H} = \frac{R_R}{R'_B}$$

by adjusting $R_B$ to $R'_B$ to obtain a null reading.

Thus the following ratios are obtained $$\frac{T_D}{T_H} = \frac{R'_D}{R'_H} = \frac{R_R}{R'_B}$$

Our thermistor, exposed to temperature L, is now connected to our electronic thermometer, as further described in FIGURE 4 and by adjusting the movable intermediate contact of the potentiometer, P, to form segments X and Y we obtain a null-reading. At this time the following equations are found to be true.

$$R_R + R'_B = \frac{X}{Y}(T_D + T_H)$$

$$R'_B = \frac{X}{Y}(T_H)$$

$$R_R = \frac{X}{Y}(T_D)$$

Thus having obtained during manufacture, the ratios $$\frac{T_D}{T_H} = \frac{R'_D}{R'_H} = \frac{R_R}{R'_B}$$

we now find that $R_R$ is a measure of $T_D$ and that any changes due to exposure of the thermistor to temperatures between H and L can be balanced by an adjustment of $R_R$ so as to obtain a null-reading on the null-meter integral in our thermometer. Since in our ratio adjustment system the minimum value of $R_R$ is exactly the value to obtain a null-reading when the thermistor resistance is $T_H$ at temperature H and the maximum value of $R_R$ is exactly the value to obtain a null-reading when the thermistor resistance is increased $T_D$ at temperature L, it follows that a pre-imprinted dial scale attached to $R_R$ would at its scale ends read exactly temperature H and temperature L when the thermistor was exposed to those particular temperatures and adjustment of $R_R$ for obtaining a null-reading on the integral null-meter was made.

The accompanying drawing shows in FIGURE 1 the overall appearance of my electrical thermometer.

Figure 2:
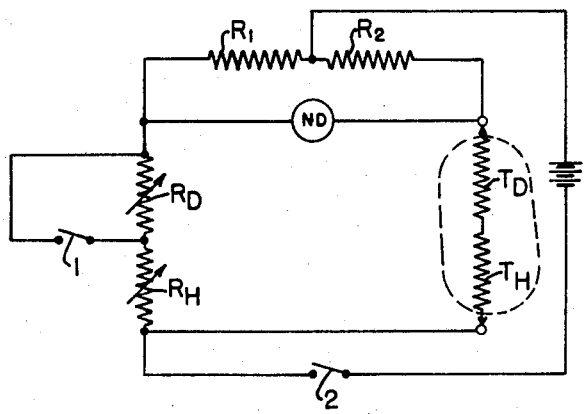
FIGURE 2 shows one of the electric adjusting test circuits used in the manufacture of my electrical thermometer. $T_H + T_D$ represents the thermistor.
Figure 3:
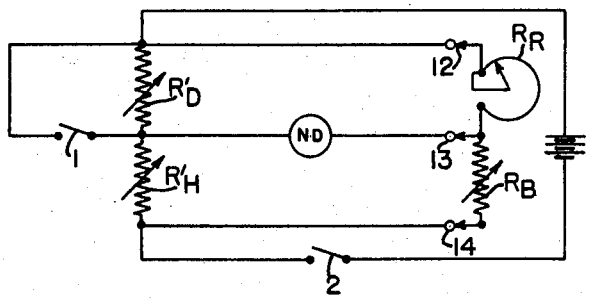
FIGURE 3 shows another electric adjusting test circuit used in the manufacture of my electrical thermometer.

The electric adjusting test circuit shown in FIGURE 2 becomes electric adjusting test circuit shown in FIGURE 3 by switching appropriate contacts via a double throw multiple pole switch not shown, thereby eliminating $R_1$, $R_2$ and the thermistor from circuit shown in FIGURE 2, and changing the connections points for the null detector and the battery and allowing for connection via three contact points 12, 13, and 14 provided in the thermometer, to the two new variable resistors, $R_R$ and $R_B$, which are integral components of the electrical thermometer.

It is the general object of the present invention to provide an improved thermometer using a thermistor that can be inexpensively manufactured. An additional object of the present invention is to provide a highly accurate electrical thermometer that is so compact that it can be held and operating in one hand.

An additional object of this invention is to provide an improved bridge circuit for use with a thermistor type electrical thermometer and, particularly, an inexpensive method of manufacturing the same. A further object of the present invention is to improve the method of manufacturing such an electrical thermometer and provide for replacement of any defective components with other commercial components.

In the drawing, FIGURES 2 and 3 show test circuits which are used in the manufacture and adjustment of the electric thermometer.

Figure 4:
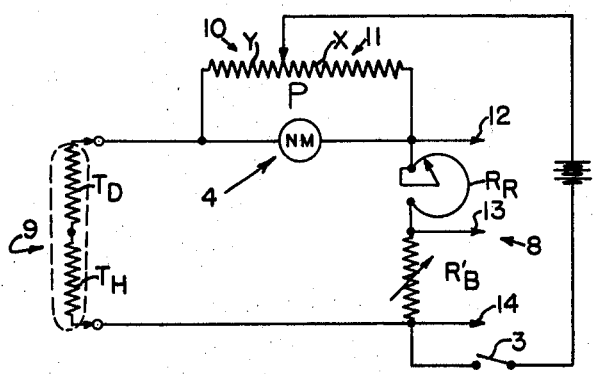
FIGURE 4 shows the electrical circuit used within my electrical thermometer for adjusting the thermometer.

FIGURE 4 shows the circuit of the electric thermometer in its final form.

In FIGURE 2, $R_1$ and $R_2$ are fixed resistors which are equal to each other in resistance value.

$R_H$ is one variable resistor. $R_D$ is another variable resistor. $T_D$ and $T_H$ together represents a thermistor resistor. $T_H$ represents the resistance of the thermistor at the highest temperature of the range of temperatures to be measured and $T_D$ represents the increase in resistance of the thermistor when the thermistor is subjected to the lowest temperature of the temperature range to be measured. Therefore $T_H$ plus $T_D$ represents the resistance of the thermistor at the low end of the temperature range. For our clinical thermometer the chosen low end of the range would be 96° F. and the chosen high end of the range would be 106° F.

The first step in the use of the test circuit of FIGURE 2 would be to expose the thermistor to the high end of the temperature range, in the case of the clinical thermometer 106° F., which would give the thermistor an unknown resistance value $T_H$. At this time $T_D$ adds no additional resistance as $T_D$ must be equal to zero, since $T_D$ is the increase in resistance of the thermistor when it is subjected to the lower temperature as compared to the resistance $T_H$ at the higher temperature. Switch 1 is now closed which shorts out variable resistor $R_D$ thus eliminating it from the circuit. Switch 2 is then closed and the variable resistor $R_H$ is adjusted until the null-detector ND registers zero. We will designate the new set resistance of $R_H$ as $R'_H$. When the circuit is thus balanced, since $R_1 = R_2$ then $R'_H$ in the balanced condition must equal $T_H$.

In the second step in the use of the test circuit in FIGURE 2, the thermistor is subjected to the lowest temperature of the temperature range, which in the case of a clinical thermometer would be 96° F. Switch 1, is now left open and Switch 2 is again closed and the circuit now balanced by adjusting and setting the variable resistor $R_D$ to some fixed resistance value. The balance is achieved when the null-detector ND shows no current flowing. At this point the set adjusted value of $R_D$ will be equal to $T_D$. We will designate the new fixed resistance of $R_D$ as $R'_D$. Thus we obtain the ratio of $$\frac{R'_D}{R'_H} = \frac{T_D}{T_H}$$

since $R'_D = T_D$ and $R'_H = T_H$.

In FIGURE 3, with adjustable resistor $R_R$ at its maximum the circuit is balanced by closing Switch 2 and then by adjusting the variable resistor $R_B$ until the null-detector ND shows no flow of current. We will designate the new adjusted set resistance value of $R_B$ as $R'_B$. Now in the balanced condition $$\frac{R'_D}{R'_H} = \frac{R_R(\text{maximum})}{R'_B}$$

$R'_D$ and $R'_H$ have previously been set by the use of the circuit FIGURE 2, as explained above so that $$\frac{R'_D}{R'_H} = \frac{T_D}{T_H}$$

and thus also $$\frac{T_D}{T_H} = \frac{R_R(\text{maximum})}{R'_B}$$

In FIGURE 4 P is a commercial type potentiometer which is an integral component of the electronic thermometer. The movable contact in the potentiometer divides it into two resistance segments, designated X and Y. The circuit in FIGURE 4 is balanced by closing Switch 3 and adjusting and setting potentiometer P until no current flow is shown by the null-meter NM. When the circuit of FIGURE 4 is thus balanced, then:

$$\frac{R_R + R'_B}{T_D + T_H} = \frac{X}{Y}$$

Therefore $$R_R + R'_B = \frac{X}{Y}(T_D + T_H)$$

(Equation A)

Utilizing the ratio previously obtained $$\frac{T_D}{T_H} = \frac{R_R}{R'_B}$$

substitute first for $R'_B$ in Equation A $$R_R = \frac{X}{Y} T_D$$

substitute next for $R_R$ in Equation A $$R'_B = \frac{X}{Y} T_H$$

The potentiometer P is now set in this position, thus fixing the value of $X/Y$. Now $R_R + R'_B$ is a measure of $T_D + T_H$; $R'_B$ is a measure of $T_H$; $R_R$ is a measure of $T_D$. From the above, it is apparent that the variable resistor $R_R$ will be a measure of the change ($T_D$) in resistance of the thermistor when it is connected in the thermometer circuit as shown in FIGURE 4, the thermistor being schematically represented by $T_D + T_H$. Since X and Y are now fixed, closing the Switch 3 and balancing the circuit by adjusting $R_R$ until the null-meter NM shows no current flowing will give a measure of the increase in resistance of the thermistor from its $T_H$ value, therefore, of the temperature being measured.

Attached to the rotor shaft of the variable resistor $R_R$ is a dial 5 preinscribed with the temperature range desired, that is in the case of a clinical thermometer from 96° F. at the low point to 106° F. at a high point and the scale of intermediate values in between. The dial scale arc of the preinscribed dial is made equal to the electrical arc of rotation of $R_R$. $R_R$ is so connected that the zero resistance value point of $R_R$ matches the high temperature reading marking and the high resistance value point of $R_R$ matches the low temperature reading marking of the preinscribed dial. For this particular range, it has been found that the linear proportional scale will be quite satisfactory if an error of no more than 0.25° F. is acceptable. For greater accuracy or other ranges of temperature it may be necessary to determine a pattern for the scale via a pilot model in order to compensate for any deviation from the linear change of thermistor resistance with temperature that might occur. Thus a characteristic scale for each particular type of thermistor at a particular range of temperature would be available.

In FIGURE 4 the first leg 8 of the circuit consists of two variable resistors $R_R$ and $R'_B$; the second leg 9 consists of the thermistor whose resistance $T_H + T_D$ varies with temperature; the third leg 10 consists of a resistance segment Y of the potentiometer P and the fourth leg 11 consists of the other resistance segment X of potentiometer P.

Since by procedure outlined above we have specifically designed and adjusted the circuit, so that the minimum resistance value of $R_R$ exactly satisfied the value of $R_R$ required for the high temperature end point and the maximum resistance value of $R_R$ exactly satisfied the value of $R_R$ required for the low temperature end point of the range involved, we have produced an accurate electronic thermometer, which exactly reads the high temperature end point and also exactly reads the low temperature end point. The intermediate temperature points in a particular clinical range utilizing a pilot model to determine the scale pattern will be within a hundredth of degree of the true value. It should be noted that this has been accomplished without the necessity of determining any exact values or the use of any precision components since the actual resistance values are not needed at any point in the procedure but only the ratios as discussed above. It should also be noted that any variation in the voltage or of strength of the battery used would not affect the accuracy of my electrical thermometer.

In the use of a thermistor there is a possibility of a self-heating error due to current flow through the thermistor itself. In order to minimize this, we fix the resistance value in the circuit of $R_R$ below a sufficiently low resistance value and the Y arm of the potentiometer P, above a sufficiently high resistance value so that with the small voltage used, normally about 1.3 volts of a standard small mercury battery, the actual current that would go through the thermistor would be so small as to cause the self-heating error to be negligible. For the same reason $R_2$ must be of sufficiently high resistance value. The circuit and procedure of my invention works in a highly satisfactory and economical manner due to the fact that although in any given group of thermistors there may be a wide variation in the actual change in resistance value with temperature it has been found that the shape of the $R/T$ curve of the given type of thermistor shows very little variance where R is resistance and T is temperature. In addition, it has been found that the ratio of the differential resistance of the thermistor between the high and low temperature to its resistance at the high temperature is very nearly the same in any given temperature range for any given type of thermistors. This factor is particularly true in the short range used for a clinical electronic thermometer.

Figure 1:
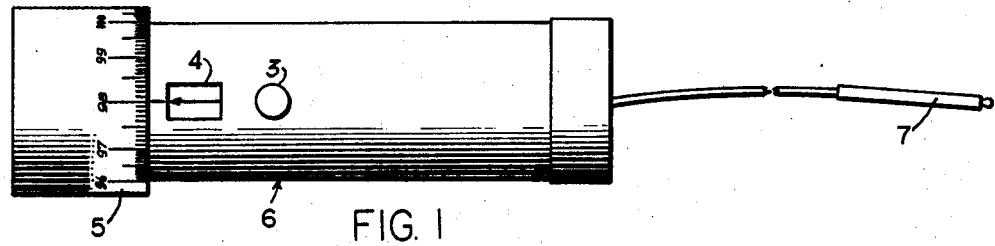

An overall view of the general appearance of my electrical thermometer in its final form is shown in FIGURE 1 where the circuitry would be enclosed in a body case 6, a push button switch 3 which is the same as switch 3 in FIGURE 4, and a null-meter indicator 4 are conveniently arranged in the body, to which a thermistor 7 is attached by a double conductor wire. The scale from 96° F. to 106° F., in the case of the clinical thermometer would be inscribed on a rotatable collar 5. This would be arranged in such a way that the entire case 6 can be held in one hand. The switch 3 is depressed by the middle finger and the scale collar 5 rotated by the thumb and index finger until the null-meter registers zero. The temperature is then read directly from the scale on collar 5. This operation can be completed while holding the instrument in one hand. The thermistor 7 can be placed in any desired body opening such as in the mouth, or on the skin surafce. The temperature in the clinical range will be obtained in less than 10 seconds while using only one hand for the manipulation and measurement. The rapid response of the thermistor to temperature is characteristic of the thermistor and partly due to the small mass of a thermistor as compared to that of the standard mercury thermometer.

The thermometer is used by placing the thermistor 7 in contact with the object whose temperature is to be measured. The variable resistance $R_R$ is now adjusted to balance the circuit, by rotating the collar 5 while depressing switch 3 until null meter 4 shows no current flow. The scale on collar 5 will then directly read the temperature being measured.

My same principle applies to other devices employing sensors whose resistance values change with other physical phenonona such as light and pressure variations which change the resistance values of the particular sensor utilized.

I claim:

1. A temperature measuring device comprising in combination, an electrical bridge circuit consisting of a first leg composed of two series connected variable resistors, a second leg composed of a temperature sensitive resistor, a third leg and fourth leg each composed of a resistance segment of the same potentiometer which has a movable intermediate contact providing thereby said third and fourth legs, a null-meter connected across the terminal ends of the potentiometer, a direct current source in series with a switch connected between the movable intermediate contact of said potentiometer and the junction point of said first leg and said second leg, one of the said two variable resistors of said first leg being adjusted and fixed to a resistance value so that its new resistance value has a ratio to the full value of the other of said two variable resistors equal to the ratio of the lowest resistance value of the temperature sensitive resistor, when exposed to the temperature at the first end of the selected temperature range, to the increase in resistance of the temperature sensitive resistor when exposed to the temperature at the second end of the selected temperature range, the above ratio being established then the said intermediate movable contact of said potentiometer is adjusted and fixed so that no current will flow thru said null-meter when said temperature sensitive resistor is exposed to said second end of the selected temperature range, the other variable resistor will read directly in terms of temperature to which the said temperature sensitive resistor is subjected by variation of its resistance so that no current will flow in the null-meter.

2. A temperature measuring device in accordance with claim 1 in which the first of the said two series connected variable resistors has been pre set such that the second said variable resistor at its zero point will balance the resistance of the temperature sensitive resistor at its lowest resistance value in the selected temperature range to produce a zero reading on said null-meter, and such that the maximum point of the second said variable resistor, will balance the maximum resistance value of the temperature sensitive resistor exposed to the other end of the selected temperature range to again produce a zero reading on the null-meter.

3. A temperature measuring device as set forth in claim 2 in which the temperature sensitive resistor is a thermistor of the negative coefficient type.

4. A temperature measuring device as set forth in claim 2, in which the temperature sensitive resistor is a thermistor of the positive co-efficient type.

5. A method of calibrating a temperature measuring bridge in which a series of test circuits is used in order to balance the final circuit, the first of said test circuits consisting of two fixed equal resistors one in each adjacent leg of said first test circuit, two variable resistors in series joined with one of said fixed resistors, a by-pass switch arranged to short-out one of said variable resistors, a thermistor joined to the other of said fixed resistors, the free end of the said two series connected variable resistors being joined to the free end of the said thermistor, a direct current source in series with a switch being connected to the junction of the two fixed resistors and to the junction of said thermistor and said variable resistor, and a null detector being connected to the junction of one fixed equal resistor and a variable resistor and to the junction of the other fixed resistor and the thermistor, the method comprising closing said by-pass switch to short out one of the variable resistors bringing said thermistor to the high point of the chosen temperature range and setting the other variable resistance equal to the resistance of the thermistor at the high temperature, opening the switch and bringing said thermistor to the low temperature end of the temperature range chosen and adjusting the variable resistor that was previously shorted-out so as to balance the circuit so that the previously shorted-out variable resistor is set equal to the additional resistance of the thermistor due to the difference in temperature, the said two variable resistors which have now been set by use of the first test circuit are now placed in a second test circuit comprising a bridge in which the said set resistors form two adjacent legs of the circuit while two new variable resistors which are constituent components in the electronic thermometer device form the other two legs of the circuit, a direct current source in series with a switch is connected to the junctions of the first two legs with the second new two legs and a null detector is now connected to the junction center of the first new two legs and the junction center of the second new two legs, the circuit is now balanced by adjusting and setting the one of the new variable resistors adjacent the resistor set equal to the thermistor resistance at its high point, while the other new variable resistor remains at its full value, the said set new variable resistor and said other new variable resistor are components in the electronic thermometer in which together they form said first leg of a bridge, the temperature measuring bridge is assembled with the variable resistors forming the first leg, the thermistor forming the second leg, and the third and fourth legs comprising a potentiometer with a movable center tap, a null meter is connected across the ends of said potentiometer, and a direct current source is connected to said center tap and the junction of said first and second legs, the electronic thermometer unit is balanced and thereby made ready for use by adjusting the movable intermediate contact of said potentiometer to a set position which produces a zero reading on the null-meter, while the connected thermistor is exposed to the low temperature end point.

6. A device for the measurement of the values of a parameter, comprising in combination, an electrical bridge circuit consisting of a first leg composed of two series connected variable resistors, a second leg composed of a sensor resistor sensitive to the parameter to be measured, a third and fourth leg, each composed of a resistance segment of the same potentiometer which has a movable intermediate contact providing thereby said third and fourth legs, a null-meter connected across the terminal ends of the potentiometer, a direct current source in series with a switch connected between the movable intermediate contact of said potentiometer and the junction point of said first leg and said second leg; one of the said variable resistors of said first leg being adjusted and fixed to a resistance value so that its new resistance value has a ratio to the full value of the other of said two variable resistors equal to the ratio of the lowest resistance value of the said sensor resistor upon its exposure to the parameter at the one end of the selected parameter range which produces the lowest resistance value, to the increase in resistance of the said sensor resistor upon its exposure at the second end of the selected parameter range; the above ratio being established the said intermediate movable contact of said potentiometer is adjusted and fixed so that no current will flow through said null-meter when said sensor resistor is exposed to said second end of the selected parameter range; thereupon the other variable resistor by means of an attached pre-inscribed dial will read directly in terms of parameter value that value of the parameter to which the said sensor resistor is subjected, by variation of the resistance of the said other variable resistor so that no current will flow in the null-meter.

References Cited

UNITED STATES PATENTS 2,753,714  7/1956  Perkins et al.
3,052,124  9/1962  Averitt.
3,184,728  5/1965  Hart et al.

LOUIS R. PRINCE, Primary Examiner

FREDERICK SHOON, Assistant Examiner

U.S. Cl. X.R.

73—362; 323—75

UNITED STATES PATENT OFFICE
CERTIFICATE OF CORRECTION

Patent No. 3,478,570                          November 18, 1969

Raymond Ratnoff

It is certified that error appears in the above identified patent and that said Letters Patent are hereby corrected as shown below:

Column 8, line 3, after "comprising" insert -- activating said current source, --; same column 8, line 61 and column 9, lines 4 and 12, "null-meter", each occurrence, should read -- null-indicator --.

Signed and sealed this 30th day of June 1970.

(SEAL)
Attest:

Edward M. Fletcher, Jr.                      WILLIAM E. SCHUYLER, JR.
Attesting Officer                             Commissioner of Patents